Patented July 19, 1949

2,476,452

UNITED STATES PATENT OFFICE 2,476,452

PRODUCTION OF AMMELIDE

Joseph H. Paden and Alexander F. MacLean, Stamford, Conn., assignors to American Cyanamid Company, New York, N. Y., a corporation of Maine No Drawing. Application May 26, 1944, Serial No. 537,530

1 Claim. (Cl. 260—249.5)

The present invention relates to the preparation of ammelide.

It has been discovered that ammelide may be readily prepared by heating a member of the group consisting of cyanamide and dicyandiamide with carbon dioxide under pressure in the presence of a solvent or a diluent.

The reaction involving the addition of carbon dioxide to dicyandiamide may be illustrated by the following equation:

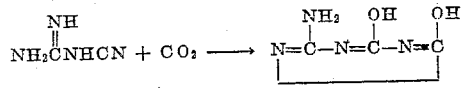

Solvents or diluents which may be used in the process include, for example, water, dioxane, pyridine, acetone, methanol, ethanol, and other low molecular weight monohydric alcohols. Such liquids, in addition to being diluents, serve at least in part as solvents for the reactants, namely the cyanamide, dicyandiamide and carbon dioxide.

In carrying out the process, a pressure vessel provided with suitable means of agitation is charged with a slurry or solution of cyanamide or dicyandiamide and the solvent or diluent. Carbon dioxide is then passed into the vessel and a pressure preferably of from 200 to 600 lbs. per sq. inch maintained throughout the run. The charge is heated to a temperature within the range of 60 to 200° C., and preferably between 100 and 160° C. The reaction medium should be well agitated to aid in dissolving the carbon dioxide gas.

Although temperatures and pressures somewhat below and above these ranges may be employed, the yield of ammelide may be lower under such conditions.

After the reaction is complete, the charge is cooled to room temperature and the precipitated ammelide removed by filtration. The product is a white crystalline material, insoluble in hot or cold water, and soluble in alkalis.

The invention is further illustrated by the following examples:

Example 1

A charge of 42 grams of dicyandiamide and 75 cc. of water was placed in a stainless steel rocker autoclave. Carbon dioxide was passed in so as to maintain a pressure of 500 lbs. per square inch. The charge was then heated to a temperature of about 150° C. After one hour under these conditions, the autoclave was cooled to room temperature, and the charge removed and filtered. 51 grams of ammelide were obtained.

Example 2

40 grams of ammelide were obtained by repeating the procedure of Example 1, using a charge of 42 grams of cyanamide and 140 cc. of water.

Example 3

252 grams of dicyandiamide, 200 grams of carbon dioxide (Dry Ice) and 500 cc. of ethanol were heated 1.3 hours at 140° C. in a stainless steel autoclave with stirring. The pressure of the carbon dioxide dropped from 490 lbs. per square inch to 250 lbs. per square inch during the reaction. The charge was cooled, filtered, and the product on the filter washed with warm water. 240 grams of ammelide were obtained.

Ammelide is of particular value as an intermediate in the preparation of compounds which find application in the field of dyestuffs and synthetic resins.

While the invention has been described with particular reference to specific embodiments, it is to be understood that it is not to be limited thereto, but is to be construed broadly and restricted solely by the scope of the appended claim.

We claim:

In a method of preparing ammelide, the steps which consist in reacting a member of the group consisting of cyanamide and dicyandiamide with carbon dioxide in the absence of ammonia at a pressure within the range of 200–600 lbs. per square inch in the presence of a solvent and at a temperature between about 60 and 200° C. to form ammelide, cooling the liquid material and recovering the precipitated ammelide.

JOSEPH H. PADEN.
ALEXANDER F. MacLEAN.

REFERENCES CITED

The following references are of record in the file of this patent:

UNITED STATES PATENTS

| Number | Name | Date |
| --- | --- | --- |
| 1,380,223 | Hjalmar | May 31, 1921 |
| 2,265,824 | Thurston | Dec. 9, 1941 |

OTHER REFERENCES

Williams: Cyanogen Compounds, 1915, page 20.